United States Patent
Sun et al.

(10) Patent No.: US 12,289,145 B2
(45) Date of Patent: Apr. 29, 2025

(54) METHOD AND APPARATUS FOR CSI ENHANCEMENT FOR MULTI-TRP COHERENT JOINT TRANSMISSION

(71) Applicant: APPLE INC., Cupertino, CA (US)

(72) Inventors: Haitong Sun, Cupertino, CA (US); Chunxuan Ye, San Diego, CA (US); Dawei Zhang, Saratoga, CA (US); Huaning Niu, San Jose, CA (US); Ankit Bhamri, Bad Nauheim (DE); Wei Zeng, Saratoga, CA (US); Hong He, San Jose, CA (US); Weidong Yang, San Diego, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/447,388

(22) Filed: Aug. 10, 2023

(65) Prior Publication Data

US 2024/0056140 A1 Feb. 15, 2024

Related U.S. Application Data

(60) Provisional application No. 63/371,133, filed on Aug. 11, 2022.

(51) Int. Cl.
*H04B 7/02* (2018.01)
*H04B 7/0456* (2017.01)

(52) U.S. Cl.
CPC .................. *H04B 7/046* (2013.01)

(58) Field of Classification Search
CPC ......... H04B 7/046; H04B 7/024; H04B 7/063
USPC .......................................... 375/267
See application file for complete search history.

(56) References Cited

U.S. PATENT DOCUMENTS

2012/0033575 A1* 2/2012 Zhang ............... H04L 25/03949
370/252
2021/0234635 A1* 7/2021 Chen ....................... H04L 25/03

OTHER PUBLICATIONS

Lenovo, "CSI enhancements for high mobility and coherent JT", R1-2204164, 3GPP TSG RAN WG1 #109-e, e-Meeting, Agenda Item 9.1.2, May 9-20, 2022, 11 pages.
MCC Support, "Draft Report of 3GPP TSG RAN WG1 #109-e v0.3.0", R1-220xxxx, 3GPP TSG RAN WG1 Meeting #110-e, Toulouse (Online meeting, May 9-20, 2022), Aug. 22-26, 2022, 243 pages.
PCT/US2023/071975, International Search Report and Written Opinion, Jan. 24, 2024, 19 pages.
PCT/US2023/071975, Invitation to Pay Additional Fees And, Where Applicable, Protest Fee, Nov. 30, 2023, 12 pages.

* cited by examiner

*Primary Examiner* — Helene E Tayong
(74) *Attorney, Agent, or Firm* — Dorsey & Whitney LLP (57) ABSTRACT

Apparatus and methods are provided for CSI enhancement for multi-TRP coherent joint transmission. A user equipment (UE) receives signals from a plurality of transmission and reception points (TRPs). The UE determines, based on the signals, multiple TRP (multi-TRP) coherent joint transmission (CJT) channel state information (CSI) report information for a codebook based on a spatial basis selection matrix, a combination coefficient matrix, and a frequency basis selection matrix. The spatial basis selection matrix is layer common, polarization common, and TRP independent. The UE reports, to one or more of the plurality of TRPs, the multi-TRP CJT CSI report information.

20 Claims, 6 Drawing Sheets

$$[w^\ell(1) \cdots w^\ell(N_3)] = \begin{pmatrix} v_0 & \cdots & v_{L-1} \\ & v_0 & \cdots v_{L-1} \end{pmatrix} \begin{pmatrix} \tilde{c}_{0,1,\ell} & \cdots & \tilde{c}_{0,M,\ell} \\ \vdots & \ddots & \vdots \\ \tilde{c}_{2L-1,1,\ell} & \cdots & \tilde{c}_{2L-1,M,\ell} \end{pmatrix} \begin{pmatrix} w_{f,1}^H \\ \vdots \\ w_{f,M}^H \end{pmatrix}$$

$W^\ell$     $W_1$     $W_2^\ell$     $W_f^H$ Spatial basis     Compressed combination coefficients     M frequency basis Dimensions: $2L$, $M$

METHOD AND APPARATUS FOR CSI ENHANCEMENT FOR MULTI-TRP COHERENT JOINT TRANSMISSION

CROSS-REFERENCE TO RELATED APPLICATION(S)

This application claims the benefit of U.S. Provisional Patent Application No. 63/371,133, filed Aug. 11, 2022, which is hereby incorporated by reference herein in its entirety.

TECHNICAL FIELD

This application relates generally to wireless communication systems, including codebook configuration.

BACKGROUND

Wireless mobile communication technology uses various standards and protocols to transmit data between a base station and a wireless communication device. Wireless communication system standards and protocols can include, for example, 3rd Generation Partnership Project (3GPP) long term evolution (LTE) (e.g., 4G), 3GPP new radio (NR) (e.g., 5G), and IEEE 802.11 standard for wireless local area networks (WLAN) (commonly known to industry groups as Wi-Fi®).

As contemplated by the 3GPP, different wireless communication systems standards and protocols can use various radio access networks (RANs) for communicating between a base station of the RAN (which may also sometimes be referred to generally as a RAN node, a network node, or simply a node) and a wireless communication device known as a user equipment (UE). 3GPP RANs can include, for example, global system for mobile communications (GSM), enhanced data rates for GSM evolution (EDGE) RAN (GERAN), Universal Terrestrial Radio Access Network (UTRAN), Evolved Universal Terrestrial Radio Access Network (E-UTRAN), and/or Next-Generation Radio Access Network (NG-RAN).

Each RAN may use one or more radio access technologies (RATs) to perform communication between the base station and the UE. For example, the GERAN implements GSM and/or EDGE RAT, the UTRAN implements universal mobile telecommunication system (UMTS) RAT or other 3GPP RAT, the E-UTRAN implements LTE RAT (sometimes simply referred to as LTE), and NG-RAN implements NR RAT (sometimes referred to herein as 5G RAT, 5G NR RAT, or simply NR). In certain deployments, the E-UTRAN may also implement NR RAT. In certain deployments, NG-RAN may also implement LTE RAT.

A base station used by a RAN may correspond to that RAN. One example of an E-UTRAN base station is an Evolved Universal Terrestrial Radio Access Network (E-UTRAN) Node B (also commonly denoted as evolved Node B, enhanced Node B, eNodeB, or eNB). One example of an NG-RAN base station is a next generation Node B (also sometimes referred to as a g Node B or gNB).

A RAN provides its communication services with external entities through its connection to a core network (CN). For example, E-UTRAN may utilize an Evolved Packet Core (EPC), while NG-RAN may utilize a 5G Core Network (5GC).

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Various embodiments are described with regard to a UE. However, reference to a UE is merely provided for illustrative purposes. The example embodiments may be utilized with any electronic component that may establish a connection to a network and is configured with the hardware, software, and/or firmware to exchange information and data with the network. Therefore, the UE as described herein is used to represent any appropriate electronic component.

Many wireless communication standards provide for the use of known signals (e.g., pilot or reference signals) for a variety of purposes, such as synchronization, measurements, equalization, control, etc. For example, in cellular wireless communications, a reference signals (RS) may be provided to deliver a reference point for downlink power. When a wireless communication device or mobile device (i.e., UE) attempts to determine downlink power (e.g., the power of the signal from a base station, such as eNB for LTE and gNB for NR), it measures the power of the reference signal and uses it to determine the downlink cell power. The reference signal also assists the receiver in demodulating the received signals. Since the reference signals include data known to both the transmitter and the receiver, the receiver may use the reference signal to determine/identify various characteristics of the communication channel. This is commonly referred to as channel estimation, which is used in many high-end wireless communications such as LTE and 5G-NR communications. Known channel properties of a communication link in wireless communications are referred to as channel state information (CSI), which provides information indicative of the combined effects of, for example, scattering, fading, and power decay with distance. The CSI makes it possible to adapt transmissions to current channel conditions, which is useful for achieving reliable communications with high data rates in multi-antenna systems.

Oftentimes multi-antenna systems use precoding for improved communications. Precoding is an extension of beamforming to support multi-stream (or multi-layer) transmissions for multi-antenna wireless communications and is used to control the differences in signal properties between the respective signals transmitted from multiple antennas by modifying the signal transmitted from each antenna according to a precoding matrix. In one sense, precoding may be considered a process of cross coupling the signals before transmission (in closed loop operation) to equalize the demodulated performance of the layers. The precoding matrix is generally selected from a codebook that defines multiple precoding matrix candidates, wherein a precoding matrix candidate is typically selected according to a desired performance level based on any of a number of different factors such as current system configuration, communication environment, and/or feedback information from the receiver (e.g., UE) receiving the transmitted signal(s).

The feedback information is used in selecting a precoding matrix candidate by defining the same codebook at both the transmitter and the receiver, and using the feedback information from the receiver as an indication of a possibly preferred precoding matrix. In such cases the feedback information includes what is referred to as a precoding matrix index (PMI), which can be based on properties of the signals received at the receiver. For example, the receiver may determine that a received signal has relatively low signal-to-noise ratio (SNR), and may accordingly transmit a PMI that would replace a current precoding matrix with a new precoding matrix to increase the signal-to-noise ratio (SNR).

In 3GPP NR systems, two types of codebook, Type I codebook and Type II codebook, have been standardized for CSI feedback in support of advanced MIMO operations. The two types of codebook are constructed from a two-dimensional (2D) discrete Fourier transform (DFT) based grid of beams, enabling CSI feedback of beam selection and phase shift keying (PSK) based co-phase combining between two polarizations. Type II codebook based CSI feedback also reports the wideband and subband amplitude information of the selected beams, allowing for more accurate CSI to be obtained. This, in turn, provides improved precoded MIMO transmissions over the network.

Under certain circumstances, the set of precoding matrix candidates that can be selected from the codebook may need to be limited. For example, the network may prevent the receiver from selecting some precoding matrix candidates while allowing it to select others. This is commonly referred to as codebook subset restriction (CBSR). CBSR may include the transmission of a CBSR bitmap from a transmitter (e.g., base station) to a receiver (e.g., UE). The CBSR bitmap typically includes a bit corresponding to each precoding matrix in the codebook, with the value of each bit (e.g., "0" or "1") indicating to the receiver whether or not the receiver is restricted from considering a corresponding precoding matrix candidate as a possibly preferred precoding candidate to request from the base station. One disadvantage of CBSR is increased signaling overhead. For example, in some systems, the CBSR bitmap might contain a high number (e.g. 64) of bits per channel, requiring a transmitting device to transmit a relatively large amount of information to implement CBSR for all of its channels.

For multi-user multiple-in multiple-out (MIMO) systems, a base station may configure multiple UEs (e.g. two UEs) to report their precoding matrices, or precoding matrix candidates in mutually orthogonal directions. To reduce the CSI computation complexity for the UE, a base station may remove from consideration, based on uplink measurements, certain unlikely beams, thereby allowing the UE to not test the precoders formed by those beams that were removed from consideration. In other words, in order to reduce computation complexity, based on UL measurements the base station can restrict the UE to narrow the search space. Thus, the UE does not have to consider the entire codebook.

For 3GPP Release-15 (Rel-15) Type II port selection codebook, a beam-formed channel state information reference signal (CSI-RS) exploits downlink (DL) and uplink (UL) channel reciprocity. For example, the base station estimates the UL channel and, based on channel reciprocity, acquires the channel state information regarding the DL channel. Then, based on the DL channel information, the base station precodes different ports in CSI-RS differently for the UE to perform further CSI reporting for CSI refinement. The UE measures CSI-RS and provides feedback to the base station. For a total number X of CSI-RS ports, X/2 ports are horizontally polarized (H-pol) and X/2 ports are vertically polarized (V-pol). L CSI-RS ports are selected out of X/2 CSI-RS ports. The first CSI-RS port may be selected every d ports (e.g., d is either 1 or 2 or 3 or 4). Then, consecutive L (e.g., 1, 2, 4) ports are selected with wrap around.

3GPP Rel-16 Type II port selection codebook enhancement uses the same port selection design as 3GPP Rel-15. When subband PMI is configured, a frequency domain DFT matrix can be used to compress the linear combination coefficients.

For Type II port selection codebook, it may be assumed that the base station will precode the CSI-RS based on channel reciprocity (i.e., DL channel estimated based on UL channel). For frequency division duplexing (FDD), exact channel reciprocity may not exist, especially when the duplexing distance is large. However, even for FDD, partial reciprocity may still exist when, for example, the angle of arrival or departure is similar between DL and UL carriers and/or the channel delay profile is similar between DL and UL carriers.

Figure 1:
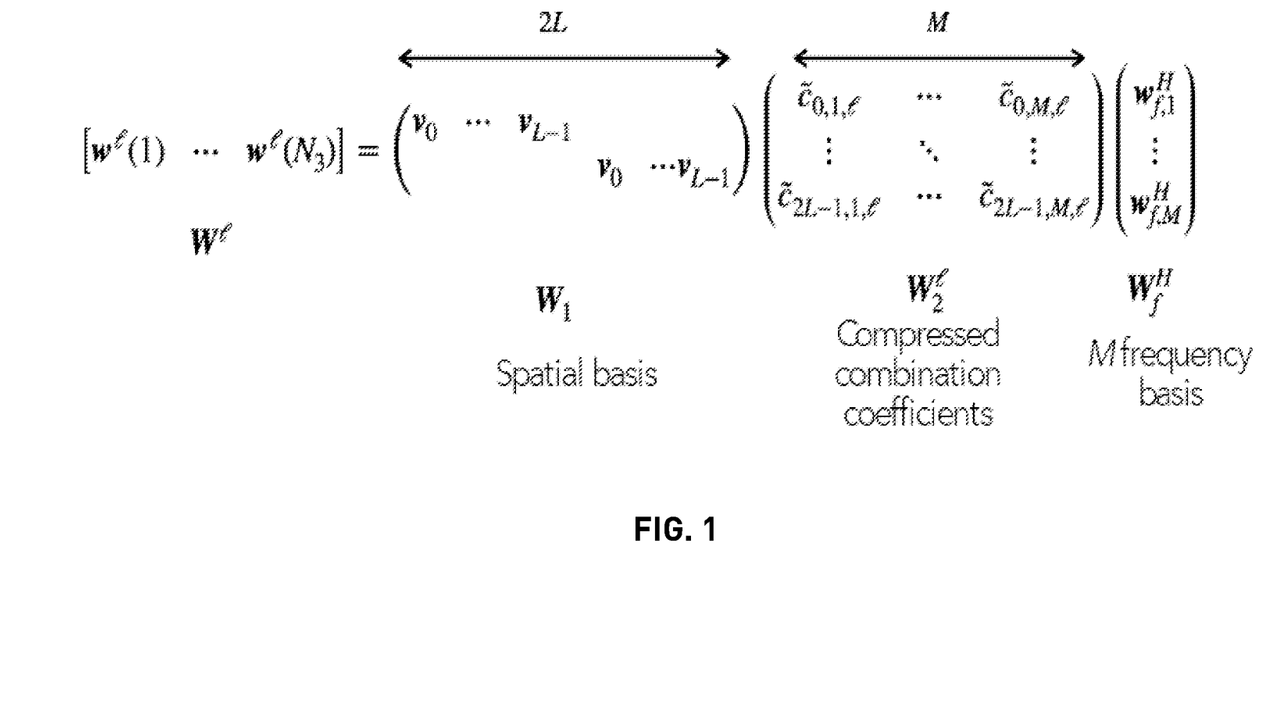
FIG. 1 illustrates a PMI matrix (codebook) used in certain embodiments herein.

FIG. 1 illustrates a PMI matrix (codebook) used in certain embodiments herein. In the illustrated example, a Type II port selection codebook structure is given by $W^\ell = W_1^* W_2^\ell {}^* W_f^H$ (also notated for simplicity herein as $W = W_1^* W_2^* W_f$ or W=W1W2Wf), where W is the PMI matrix (also referred to herein simply as codebook), $W_1$ is a spatial basis selection matrix (also referred to herein as a port selection matrix $W_1$), $W_2$ provides compressed combination coefficients, $W_f$ is a frequency basis selection matrix, $\ell$ is a layer index, $N_3$ is the number of PMI subbands in frequency (i.e., the length or number of entries in each frequency base), L is the number of selected spatial basis (i.e., number of selected ports), M is the number of selected frequency basis, and H denotes a Hermitian matrix or conjugate transpose operation. For simplicity, "$W_f$" or "Wf" assumes that the Hermitian operation has already been performed. These and other parameters of $W^\ell = W_1^* W_2^\ell {}^* W_f^H$ are shown in other figures and/or described in detail below.

In certain systems, for port selection codebook enhancements utilizing DL/UL reciprocity of angle and/or delay, support is provided for codebook structure $W = W_1^* W_2^* W_f$, where the port selection matrix $W_1$ is a free selection matrix, with the identity matrix as a special configuration. The frequency basis selection matrix $W_f$ is a DFT based compression matrix in which $N_3 = N_{CQISubband}*R$ and Mv>=1, where R is a size of the channel quality indicator (CQI) subband divided by the size of the PMI subband, and Mv is the number of selected frequency basis. $N_3$ is the number of PMI subbands for frequency basis selection. At least one value of Mv>1 may be supported. In certain such systems, value(s) of Mv may be decided (e.g., Mv=2). In other embodiments, support of Mv>1 is a UE optional feature, taking into account UE complexity related to codebook parameters. However, candidate value(s) of R, mechanisms for configuring/indicating to the UE and/or mechanisms for selecting/reporting by UE for $W_f$ have yet to be determined. In addition, or in other systems, $W_f$ can be turned off by the base station. When turned off, $W_f$ may be an all-one vector.

In Rel-15, Type II and Type II port selection codebook is specified based on $W_1 * W_2$. In Rel-16, enhanced Type II and Type II port selection codebook is specified based on $W_1 * W_2 * W_f$.

In Rel-17, further enhanced Type II port selection codebook is specified. For example, CSI feedback in Rel-17 is further enhanced for non-coherent joint transmission (NCJT) for multiple transmission and reception point (TRP) operation (referred to as multi-TRP or mTRP). In certain wireless networks, NCJTs may be used to provide multiple-input multiple-output (MIMO), multiple-user (MU) MIMO, and/or coordinated multi-point (CoMP) communications. The NCJTs may be from multi-TRP, multiple panels (multi-panels) of a TRP, or a combination thereof. Coherent joint transmission (CJT) uses synchronization among TRPs. However, for distributed TRPs, the precoders may not be jointly designed and such that the TRPs are not synchronized. Instead, each TRP derives the precoder independently without knowledge of the precoders used by the other TRPs. Thus, the joint transmission is non-coherent. In Rel-17, CSI feedback for NCJT for multi-TRPs is based on Type I MIMO codebook, which may support single downlink control information (DCI) multi-TRP NCJT scheme 1a (i.e., spatial domain multiplexing (SDM)).

In certain communication systems (e.g., Rel-18 NR), it may be desirable to provide CSI enhancement to support CJT for multi-TRP. CJT assumes that multiple TRPs can jointly precode the transmission in a coherent way. Certain such systems may, for example, target frequency range 1 (FR1) and up to four TRPs, assuming an ideal backhaul and synchronization as well as the same number of antenna ports across TRPs, as follows: Rel-16/17 Type II codebook refinement for CJT mTRP targeting FDD and its associated CSI reporting, taking into account throughput-overhead tradeoff. However, embodiments disclosed herein are not so limited (fewer than four or more than four TRPs may be used).

To reduce signaling overhead, embodiments herein provide codebook designs to support multi-TRP CJT CSI reporting. Certain embodiments provide a codebook structure. In addition, or in other embodiments, designs are provided for the spatial basis selection matrix $W_1$. In addition, or in other embodiments, designs are provided for the frequency basis selection matrix $W_f$. In addition, or in other embodiments, designs are provided for the combination coefficient matrix $W_2$.

Figure 2:
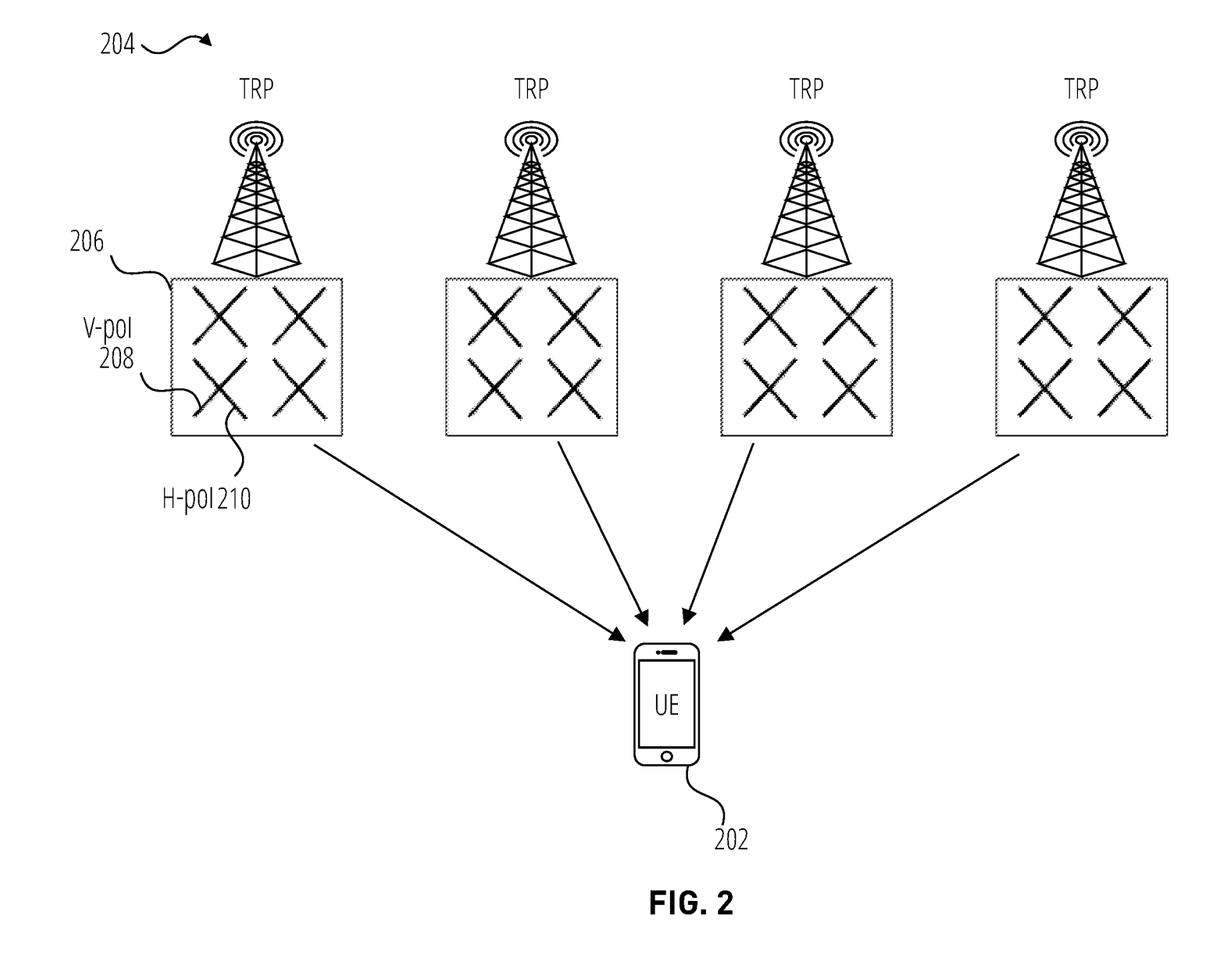
FIG. 2 illustrates multi-TRP operation that may be used according to certain embodiments disclosed herein.

For example, FIG. 2 illustrates multi-TRP operation that may be used according to certain embodiments disclosed herein. A UE 202 receives signals from four TRPs 204. Each TRP includes an antenna panel 206 that has eight ports (i.e., antenna elements), wherein four of the ports are V-pol and four of the ports are H-pol. For example, a cross-polarized antenna may include a V-pol port 208 and an H-pol port 210. Thus, the four TRPs 204 use a combined total of 32 ports.

In certain embodiments, for multi-TRP CJT CSI reporting, the UE 202 may use a first codebook structure given by $$W_l = \begin{bmatrix} c^1 \cdot W_1^1 \cdot W_2^1 \cdot W_f^1 \\ \ldots \\ c^T \cdot W_1^T \cdot W_2^T \cdot W_f^T \end{bmatrix}_l,$$

where $W^t = W_1^t \cdot W_2^t \cdot W_f^t$, $t=1, 2, \ldots, T$ is the Type II codebook reported for TRP t, T is the total number of TRPs, $c^t$ is the linear combination coefficient applied to each codebook for different TRPs, and $l=0, 1, \ldots, RI-1$ is the layer index corresponding to rank indicator (RI). Alternatively, the UE 202 may use a second codebook structure given by $$W_l = \begin{bmatrix} W_1^1 & 0 & 0 \\ 0 & \ddots & 0 \\ 0 & 0 & W_f^T \end{bmatrix}_l \cdot (W_2)_l \cdot (W_f)_l.$$

Embodiments disclosed herein CSI provide enhancements for multi-TRP CJT, a CSI codebook design for the spatial basis selection matrix $W_1^t$, a CSI codebook design for the frequency basis selection matrix $W_f^t$, and a CSI codebook design for combination coefficient matrix $W_2^t$.

Codebook Structure W1

In certain embodiments, for the first codebook structure $$W_l = \begin{bmatrix} c^1 \cdot W_1^1 \cdot W_2^1 \cdot W_f^1 \\ \ldots \\ c^T \cdot W_1^T \cdot W_2^T \cdot W_f^T \end{bmatrix}_l$$

and the second codebook structure $$W_l = \begin{bmatrix} W_1^1 & 0 & 0 \\ 0 & \ddots & 0 \\ 0 & 0 & W_f^T \end{bmatrix}_l \cdot (W_2)_l \cdot (W_f)_l,$$

for the spatial basis reporting (i.e., $W_1^t$), in terms of the spatial basis reporting for different layers, spatial basis reporting may be layer common for each TRP (i.e., the same spatial basis is reported for all the layers for a particular TRP), or the spatial basis reporting may be layer independent for each TRP (i.e., the independent spatial basis is reported for each layer for a particular TRP). In terms of the spatial basis reporting for different polarization, for example vertical polarization (V-Pol), or horizontal polarization (H-Pol), the spatial basis reporting may be polarization common for each layer per TRP, or the spatial basis reporting may be polarization independent for each layer per TRP.

For the first codebook structure and the second codebook structure, in terms of the spatial basis reporting for different TRP, a CSI-RS group (i.e., either CSI-RS port group or CSI-RS resource group) may be configured by the network. For the TRPs associated with the same CSI-RS group, spatial basis reporting may be common. For the TRPs associated with different CSI-RS groups, spatial basis reporting may be independent. In another embodiment, the spatial basis reporting may be TRP common. In another embodiment, the spatial basis reporting may be TRP independent.

Codebook Structure Wf

In certain embodiments, for the first codebook structure $$W_l = \begin{bmatrix} c^1 \cdot W_1^1 \cdot W_2^1 \cdot W_f^1 \\ \ldots \\ c^T \cdot W_1^T \cdot W_2^T \cdot W_f^T \end{bmatrix}_l,$$

for the frequency basis reporting (i.e., $W_f$) in terms of the frequency basis reporting for different layer, the frequency basis reporting may be layer independent for each TRP, or the frequency basis reporting may be layer common for each TRP. When the frequency basis reporting may be layer common for each TRP, a different option can be chosen for different codebook. For example, for a regular Type II codebook, frequency basis reporting may be layer independent for each TRP. As another example, for a port selection Type II codebook, frequency basis reporting may be layer common for each TRP.

For the first codebook structure, in terms of the frequency basis reporting for different polarization (V-Pol or, H-Pol), the frequency basis reporting may be polarization common for each layer per TRP, or the frequency basis reporting may be polarization independent for each layer per TRP.

For the first codebook structure, in terms of the frequency basis reporting for different TRP, the frequency basis reporting may be TRP independent. In another embodiment, the CSI-RS group (i.e., either CSI-RS port group or CSI-RS resource group) may be configured by the network, wherein for the TRPs associated with the same CSI-RS group, the frequency basis reporting is common, and wherein for the TRPs associated with different CSI-RS group, the frequency basis reporting is independent. In another embodiment, the frequency basis reporting is TRP common.

In certain embodiments, for the second codebook structure $$W_l = \begin{bmatrix} W_1^1 & 0 & 0 \\ 0 & \ddots & 0 \\ 0 & 0 & W_f^T \end{bmatrix}_l \cdot (W_2)_l \cdot (W_f)_l,$$

for the frequency basis reporting (i.e., $(W_f)_l$), in terms of the frequency basis reporting for different layer, the frequency basis reporting is layer independent for each TRP. In another embodiment, the frequency basis reporting is layer common for each TRP, wherein different options can be chosen for different codebooks. For example, for regular Type II codebook, frequency basis reporting is layer independent for each TRP. As another example, for port selection Type II codebook, frequency basis reporting is layer common for each TRP.

For the second codebook structure, in terms of the frequency basis reporting for different polarization (V-Pol, or H-Pol), the frequency basis reporting may be polarization common for each layer per TRP, or the frequency basis reporting may be polarization independent for each layer per TRP.

For the second codebook structure, in terms of the frequency basis reporting for different TRP, in one embodiment, the frequency basis reporting is TRP independent for $(W_f)_l = [(W_f^1)_l, \ldots, (W_f^K)_l]^H$, wherein K is the number of CSI-RS port or resource group, wherein TRPs associated with the same CSI-RS group share the same frequency basis, wherein TRPs associated with different CSI-RS groups have independent frequency basis, and wherein K=T is special case (i.e., each TRP has independent frequency basis selection). In another embodiment, the frequency basis reporting is TRP common.

Codebook Structure W2

In certain embodiments, for the first codebook structure $$W_l = \begin{bmatrix} c^1 \cdot W_1^1 \cdot W_2^1 \cdot W_f^1 \\ \ldots \\ c^T \cdot W_1^T \cdot W_2^T \cdot W_f^T \end{bmatrix}_l,$$

for the coefficient reporting (i.e., $W_2^r$), in terms of the coefficient reporting for different layers, the coefficient reporting may be layer independent for each TRP, or the coefficient reporting may be layer common for each TRP.

For the first codebook structure, in terms of the coefficient reporting for different polarization (V-Pol, or H-Pol), the coefficient reporting may be polarization independent for each layer per TRP, or the coefficient reporting may be polarization common for each layer per TRP.

For the first codebook structure, in terms of the coefficient reporting for different TRPs, in one embodiment, the coefficient reporting may be TRP independent. In another embodiment, the CSI-RS group (i.e., either CSI-RS port group or CSI-RS resource group) may be configured by the network. For example, for the TRPs associated with the same CSI-RS group, the coefficient reporting is common. As another example, for the TRPs associated with different CSI-RS group, the coefficient reporting is independent. In another embodiment, the coefficient reporting is TRP common.

In certain embodiments, for the second codebook structure $$W_l = \begin{bmatrix} W_1^1 & 0 & 0 \\ 0 & \ddots & 0 \\ 0 & 0 & W_f^T \end{bmatrix}_l \cdot (W_2)_l \cdot (W_f)_l,$$

for the coefficient reporting (i.e., $(W_2)_l$), in terms of the coefficient reporting for different layers, the coefficient reporting may be layer independent for each TRP, or the coefficient reporting may be layer common for each TRP.

For the second codebook structure, in terms of the coefficient reporting for different polarization (V-Pol or H-Pol), the coefficient reporting may be polarization independent for each layer per TRP, or the coefficient reporting may be polarization common for each layer per TRP.

For the second codebook structure, in terms of the coefficient reporting for different TRPs, the reported coefficient per layer can have the structure of $$(W_2)_l = \begin{bmatrix} W_2^1 & 0 & 0 \\ 0 & \ddots & 0 \\ 0 & 0 & W_2^K \end{bmatrix}_l,$$

wherein K is the number of CSI-RS port or resource group, wherein a zero coefficient is assumed between TRPs associated with the different CSI-RS groups, wherein K=T is a special case (i.e., the second codebook structure becomes the first codebook structure), and wherein K=1 is a special case (i.e., fully flexible W2 reporting).

In certain embodiments, for the first codebook structure and the second codebook structure, for the coefficient reporting (i.e., $(W_2)_l$), across different layers, the UE is allowed to report the relative amplitude of different layers (i.e., $(W_2)_i$ and $(W_2)_j$ where i≠j). Thus, the UE can report the relative strength difference of $(W_2)_i$ and $(W_2)_j$, for example, in terms of the strongest coefficient per layer.

In certain embodiments, for the first codebook structure and the second codebook structure, for the coefficient reporting (i.e., $(W_2)_l$), the network configures the maximum number of non-zero coefficients (NZC) that can be reported across all layers. In another embodiment, the network configures the maximum number of NZC that can be reported per layer (e.g., the maximum number of NZC may be reported as a percentile of the total number of coefficients in $W_2$. In addition, or in other embodiments, in the CSI reports, the UE may select the reported NZC as long as the number of reported NZC is less than or equal to the network configured maximum number of NZC. The number of reported NZC may be reported in CSI part 1. Alternatively, the location of the reported NZC and its quantized phase and amplitude may be reported in CSI part 2 (group 1 and group 2).

In certain embodiments, for the first codebook structure and the second codebook structure, for the coefficient reporting for each layer (i.e., $(W_2^k)_l$, where k=1, . . . , K), for different CSI-RS port or resource groups (i.e., $W_2^k$), the coefficient report is independent. For example, the report of the following parameters may be independent subject to the total number of NZCs: the strong coefficient location (SCL); the number of NZC; the location of NZC; and/or the quantized phase and amplitude for each NZC.

In certain embodiments, for the first codebook structure and the second codebook structure, for the coefficient reporting for each layer (i.e., $(W_2^k)_l$, where k=1, . . . , K), when differential quantization is used, for the differentially quantized NZC, the amplitude quantization may be 3 bits (−3 dB step size) and/or the phase quantization comprises 4 bits (pi/8 resolution).

In certain embodiments, for the first codebook structure and the second codebook structure, for the coefficient reporting for each layer (i.e., $(W_2^k)_l$, where k=1, . . . , K), the UE reports the NZC and its quantized phase and amplitude, wherein differential quantization is used. For the reference of the differential quantization, in one embodiment, the strongest coefficient is used for reference for (1) other coefficients in the same polarization, and (2) strongest coefficient in the other polarization. The strongest coefficient may be assumed to have an amplitude of 1 and phase of 0. The SCL may be assumed to correspond to direct current (DC) frequency basis (i.e., in the first column for at least one $(W_2^k)_l$ or all of $(W_2^k)_l$), or the SCL may be reported flexibly in any location of $(W_2^k)_l$.

In another embodiment, for the reference of the differential quantization, the strongest coefficient in the other polarization is used for reference of quantization of the other coefficients in the same polarization. The strongest coefficient in the other polarization may be quantized with 4 bits in amplitude (−1.5 dB step size) and 4 bits in phase (pi/8 step size). The location of the strongest coefficient may not be explicitly reported. Rather, the location of the strongest coefficient may be implicitly reported as the other coefficients in the same polarization (i.e., maximum amplitude quantization is reported as 1).

Figure 3:
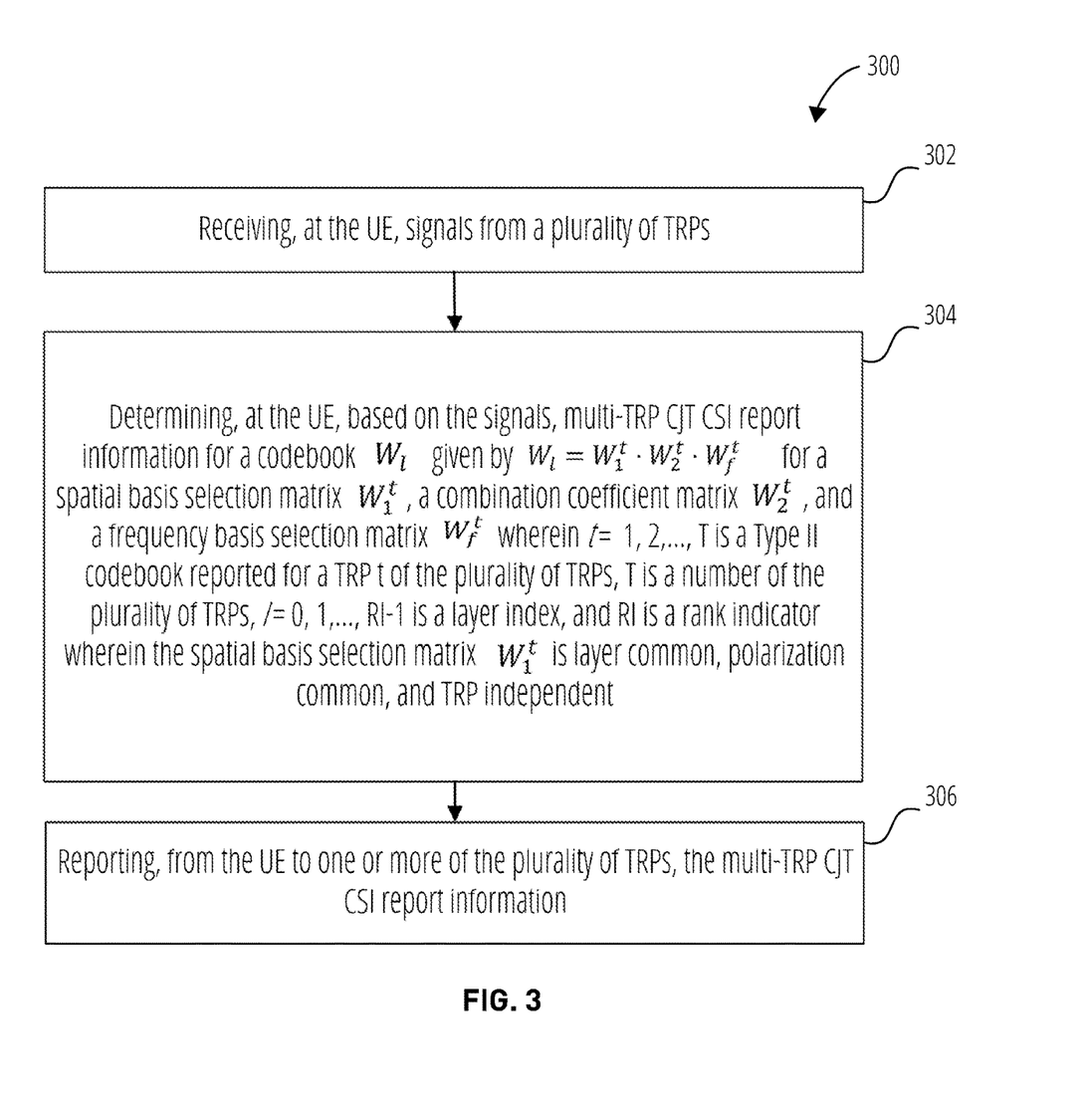
FIG. 3 illustrates a flowchart of a method for a UE, according to embodiments herein.

FIG. 3 illustrates a flowchart of a method 300 for a UE according to embodiments herein. The illustrated method 300 includes receiving 302, at the UE, signals from a plurality of TRPs. The method 300 further includes determining 304, at the UE, based on the signals, multi-TRP CJT CSI report information for a codebook $W_l$ given by $W_l = W_1^t \cdot W_2^t \cdot W_f^t$ for a spatial basis selection matrix $W_1^t$, a combination coefficient matrix $W_2^t$, and a frequency basis selection matrix $W_f^t$, wherein t=1, 2, . . . , T is a Type II codebook reported for a TRP t of the plurality of TRPs, T is a number of the plurality of TRPs, l=0, 1, . . . , RI-1 is a layer index, and RI is a rank indicator and wherein the spatial basis selection matrix $W_1^t$ is layer common, polarization common, and TRP independent. The method 300 further includes reporting 306 from the UE to one or more of the plurality of TRPs, the multi-TRP CJT CSI report information.

In some embodiments of the method 300, the codebook $W_l$ is given by:

$$W_l = \begin{pmatrix} c^1 \cdot W_1^1 \cdot W_2^1 \cdot W_f^1 \\ \ldots \\ c^T \cdot W_1^T \cdot W_2^T \cdot W_f^T \end{pmatrix}_l,$$

wherein $c^t$ is a linear combination coefficient applied to each codebook for different TRPs of the plurality of TRPs. In some such embodiments, for a regular Type II codebook, the frequency basis selection matrix $W_f^t$ is independently reported for each layer. In some embodiments, for a port selection Type II codebook, the frequency basis selection matrix $W_f^t$ is layer common for each layer. In some embodiments, the frequency basis selection matrix $W_f^t$ is polarization common for each layer per TRP of the plurality of TRPs. In some embodiments, the frequency basis selection matrix $W_f^t$ is TRP independent for each TRP of the plurality of TRPs. In some embodiments, the frequency basis selection matrix $W_f^t$ is TRP common for each TRP of the plurality of TRPs. In some such embodiments, the combination coefficient matrix $W_2^t$ is reported independently for each layer. In some embodiments, the combination coefficient matrix $W_2^t$, for different polarizations, is polarization independent for each layer per TRP of the plurality of TRPs. In some embodiments, the combination coefficient matrix $W_2^t$ is TRP independent for each TRP of the plurality of TRPs.

In some embodiments of the method 300, the codebook $W_l$ is given by:

$$W_l = \begin{pmatrix} W_1^1 & 0 & 0 \\ 0 & \ddots & 0 \\ 0 & 0 & W_1^T \end{pmatrix}_l \cdot (W_2)_l \cdot (W_f)_l.$$

In some such embodiments, for a regular Type II codebook, the frequency basis selection matrix $W_f^t$ is independently reported for each layer. In some embodiments, for a port selection Type II codebook, the frequency basis selection matrix $W_f^t$ is layer common for each layer. In some embodiments, the frequency basis selection matrix $W_f^t$ is polarization common for each layer per TRP of the plurality of TRPs. In some embodiments, the frequency basis selection matrix $W_f^t$ is TRP independent for each TRP of the plurality of TRPs. In some embodiments, the frequency basis selection matrix $W_f^t$ is TRP common for each TRP of the plurality of TRPs. In some such embodiments, the combination coefficient matrix $W_2^t$ is layer independent for each layer. In some embodiments, the combination coefficient matrix $W_2^t$ is polarization independent for each layer per TRP of the plurality of TRPs.

In some embodiments, the method 300 further comprises selecting, from the multi-TRP CJT CSI report information, a number of reported NZCs, wherein the number of reported NZCs is less than or equal to a number of configured maximum number of NZCs, by a wireless network. In some such embodiments, the number of reported NZCs is reported in CSI part 1. In certain such embodiments, a location, a quantized phase, and an amplitude of the reported NZC is reported in CSI part 2.

In some embodiments of the method 300, for different CSI-RS ports or resource groups, a coefficient report is independent for each layer and is based on a total number of NZC parameters. In some such embodiments, the total number of NZC parameters is selected from a group comprising one or more of an SCL, a number of NZCs, a location of the NZCs, a quantized phase of the NZC, and an amplitude for the NZC. In some embodiments of the method 300, coefficient reporting for each layer uses differential quantization for differently quantized NZC. In some such embodiments, an amplitude quantization is 3 bit with a −3 dB step size. In some such embodiments, a phase quantization is 4 bits with a pi/8 resolution.

In some embodiments, the method 300 further comprises, reporting, for each layer of the combination coefficient matrix, an NZC, the NZC's quantized phase and amplitude, and that differential quantization is used. In some such embodiments, the differential quantization includes a reference between a first strongest coefficient which is used for reference for other coefficients in a same first polarization and a second strongest coefficient for other coefficients in a same second polarization. In some such embodiments, the differential quantization includes an SCL and the SCL corresponds to a DC frequency basis. In some such embodiments, the differential quantization includes a strongest coefficient in a polarization as a reference for the differential quantization of other coefficients in a same polarization.

Embodiments contemplated herein include an apparatus comprising means to perform one or more elements of the method 300. This apparatus may be, for example, an apparatus of a UE (such as a wireless device 602 that is a UE, as described herein).

Embodiments contemplated herein include one or more non-transitory computer-readable media comprising instructions to cause an electronic device, upon execution of the instructions by one or more processors of the electronic device, to perform one or more elements of the method 300. This non-transitory computer-readable media may be, for example, a memory of a UE (such as a memory 606 of a wireless device 602 that is a UE, as described herein).

Embodiments contemplated herein include an apparatus comprising logic, modules, or circuitry to perform one or more elements of the method 300. This apparatus may be, for example, an apparatus of a UE (such as a wireless device 602 that is a UE, as described herein).

Embodiments contemplated herein include an apparatus comprising: one or more processors and one or more computer-readable media comprising instructions that, when executed by the one or more processors, cause the one or more processors to perform one or more elements of the method 300. This apparatus may be, for example, an apparatus of a UE (such as a wireless device 602 that is a UE, as described herein).

Embodiments contemplated herein include a signal as described in or related to one or more elements of the method 300.

Embodiments contemplated herein include a computer program or computer program product comprising instructions, wherein execution of the program by a processor is to cause the processor to carry out one or more elements of the method 300. The processor may be a processor of a UE (such as a processor(s) 604 of a wireless device 602 that is a UE, as described herein). These instructions may be, for example, located in the processor and/or on a memory of the UE (such as a memory 606 of a wireless device 602 that is a UE, as described herein).

Figure 4:
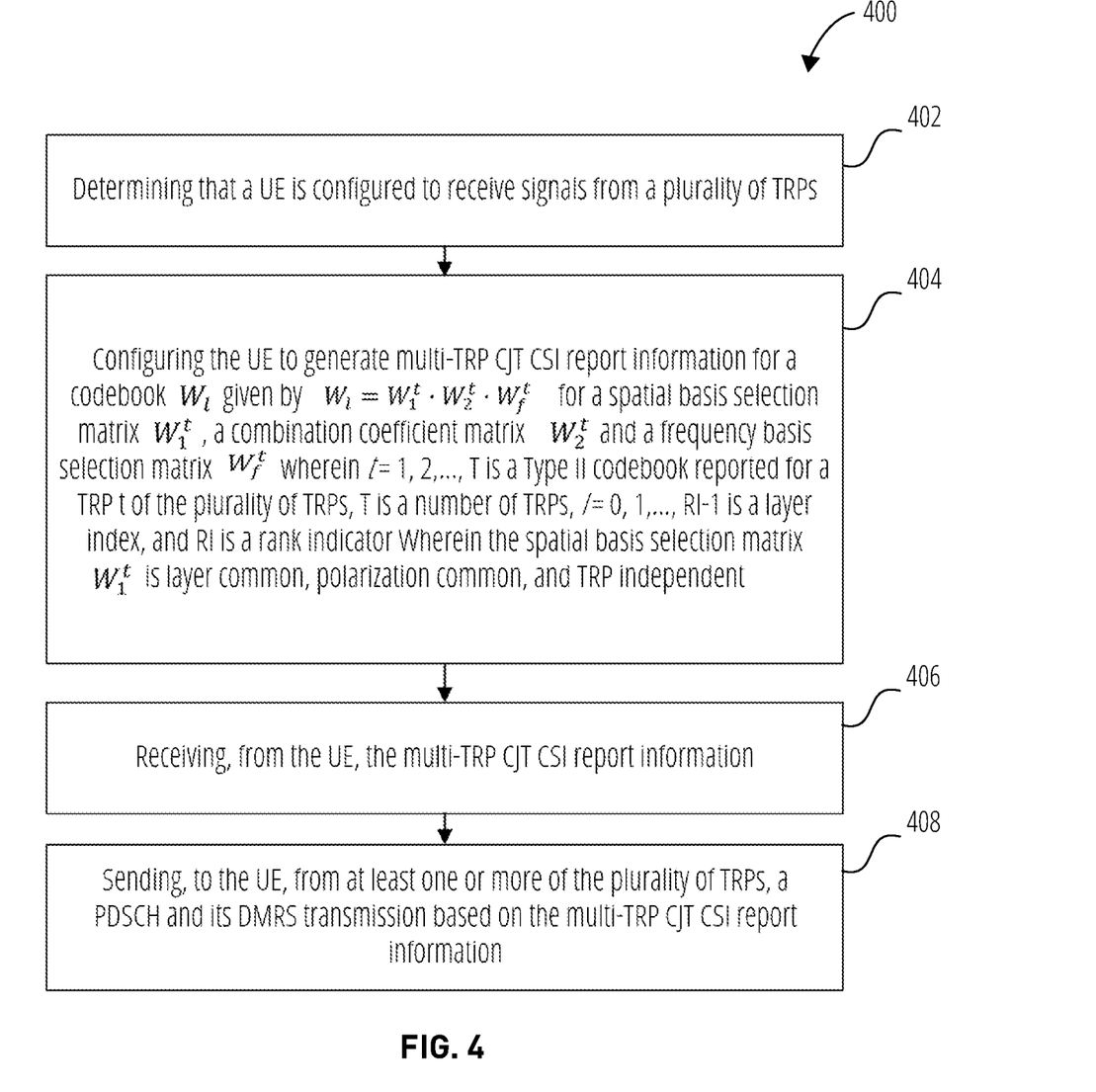
FIG. 4 illustrates a flowchart of a method for a wireless network, according to embodiments herein.

FIG. 4 illustrates a flowchart of a method 400 for a wireless network, according to embodiments herein. The illustrated method 400 includes determining 402 that a UE is configured to receive signals from a plurality of TRPs. The method 400 further includes configuring 404 the UE to generate multi-TRP CJT CSI report information for a codebook $W_l$ given by $W_l = W_1^t \cdot W_2^t \cdot W_f^t$ for a spatial basis selection matrix $W_1^t$, a combination coefficient matrix W2t, and a frequency basis selection matrix $W_f^t$, wherein t=1, 2, ..., T is a Type II codebook reported for a TRP t of the plurality of TRPs, T is a number of TRPs, l=0, 1, ..., RI-1 is a layer index, and RI is a rank indicator, and wherein the spatial basis selection matrix $W_1^t$ is layer common, polarization common, and TRP independent. The method 400 further includes receiving 406, from the UE, the multi-TRP CJT CSI report information. The method 400 further includes sending 408, to the UE, from at least one or more of the plurality of TRPs, a PDSCH and its DMRS transmission based on the multi-TRP CJT CSI report information.

In some embodiments of the method 400, the codebook $W_l$ is given by:

$$W_l = \begin{pmatrix} c^1 \cdot W_1^1 \cdot W_2^1 \cdot W_f^1 \\ \ldots \\ c^T \cdot W_1^T \cdot W_2^T \cdot W_f^T \end{pmatrix}_l,$$

wherein $c^t$ is a linear combination coefficient applied to each codebook for different TRPs of the plurality of TRPs. In some such embodiments, for a regular Type II codebook, the frequency basis selection matrix $W_f^t$ is independently reported for each layer. In some embodiments, for a port selection Type II codebook, the frequency basis selection matrix $W_f^t$ is layer common for each layer. In some embodiments, the frequency basis selection matrix $W_f^t$ is polarization common for each layer per TRP of the plurality of TRPs. In some embodiments, the frequency basis selection matrix $W_f^t$ is TRP independent for each TRP of the plurality of TRPs. In some embodiments, the frequency basis selection matrix $W_f^t$ is TRP common for each TRP of the plurality of TRPs. In some such embodiments, the combination coefficient matrix $W_2^t$ is reported independently for each layer. In some embodiments, the combination coefficient matrix $W_2^t$, for different polarizations, is polarization independent for each layer per TRP of the plurality of TRPs. In some embodiments, the combination coefficient matrix $W_2^t$ is TRP independent for each TRP of the plurality of TRPs.

In some embodiments of the method 400, the codebook $W_l$ is given by:

$$W_l = \begin{pmatrix} W_1^1 & 0 & 0 \\ 0 & \ddots & 0 \\ 0 & 0 & W_1^T \end{pmatrix}_l \cdot (W_2)_l \cdot (W_f)_l.$$

In some such embodiments, for a regular Type II codebook, the frequency basis selection matrix $W_f^t$ is independently reported for each layer. In some embodiments, for a port selection Type II codebook, the frequency basis selection matrix $W_f^t$ is layer common for each layer. In some embodiments, the frequency basis selection matrix $W_f^t$ is polarization common for each layer per TRP of the plurality of TRPs. In some embodiments, the frequency basis selection matrix $W_f^t$ is TRP independent for each TRP of the plurality of TRPs. In some embodiments, the frequency basis selection matrix $W_f^t$ is TRP common for each TRP of the plurality of TRPs. In some such embodiments, the combination coefficient matrix $W_2^t$ is layer independent for each layer. In some embodiments, the combination coefficient matrix $W_2^t$ is polarization independent for each layer per TRP of the plurality of TRPs.

In some embodiments, the method 400 further comprises configuring, at the wireless network, a maximum number of NZCs that is reported across all layers. In some such embodiments, the maximum number of NZCs is configured as a percentile of a total number of coefficients in $W_2^t$.

In some embodiments, the method 400 further comprises configuring, at the wireless network, a maximum number of NZCs that is reported per layer. In some such embodiments, the maximum number of NZCs is configured as a percentile of a total number of coefficients in $W_2^t$.

In some embodiments of the method 400, for different CSI-RS ports or resource groups, a coefficient report is independent for each layer and is based on a total number of NZC parameters. In some such embodiments, the total number of NZC parameters is selected from a group comprising one or more of an SCL, a number of NZCs, a location of the NZCs, a quantized phase of the NZC, and an amplitude for the NZC.

In some embodiments of the method 400, coefficient reporting for each layer uses differential quantization for differently quantized NZC. In some such embodiments, an amplitude quantization is 3 bit with a −3 dB step size. In some such embodiments, a phase quantization is 4 bits with a pi/8 resolution.

In some embodiments, the method 400 further comprises, reporting, for each layer of the combination coefficient matrix, an NZC, the NZC's quantized phase and amplitude, and that differential quantization is used. In some such embodiments, the differential quantization includes a reference between a first strongest coefficient which is used for reference for other coefficients in a same first polarization and a second strongest coefficient for other coefficients in a same second polarization. In some such embodiments, the differential quantization includes an SCL and the SCL corresponds to a DC frequency basis. In some such embodiments, the differential quantization includes a strongest coefficient in a polarization as a reference for the differential quantization of other coefficients in a same polarization.

Embodiments contemplated herein include an apparatus comprising means to perform one or more elements of the method 400 This apparatus may be, for example, an apparatus of a base station (such as a network device 618 that is a base station, as described herein).

Embodiments contemplated herein include one or more non-transitory computer-readable media comprising instructions to cause an electronic device, upon execution of the instructions by one or more processors of the electronic device, to perform one or more elements of the method 400. This non-transitory computer-readable media may be, for example, a memory of a base station (such as a memory 622 of a network device 618 that is a base station, as described herein).

Embodiments contemplated herein include an apparatus comprising logic, modules, or circuitry to perform one or more elements of the method 400. This apparatus may be, for example, an apparatus of a base station (such as a network device 618 that is a base station, as described herein).

Embodiments contemplated herein include an apparatus comprising: one or more processors and one or more computer-readable media comprising instructions that, when executed by the one or more processors, cause the one or more processors to perform one or more elements of the method 400. This apparatus may be, for example, an apparatus of a base station (such as a network device 618 that is a base station, as described herein).

Embodiments contemplated herein include a signal as described in or related to one or more elements of the method 400.

Embodiments contemplated herein include a computer program or computer program product comprising instructions, wherein execution of the program by a processing element is to cause the processing element to carry out one or more elements of the method 400. The processor may be a processor of a base station (such as a processor(s) 620 of a network device 618 that is a base station, as described herein). These instructions may be, for example, located in the processor and/or on a memory of the base station (such as a memory 622 of a network device 618 that is a base station, as described herein).

Figure 5:
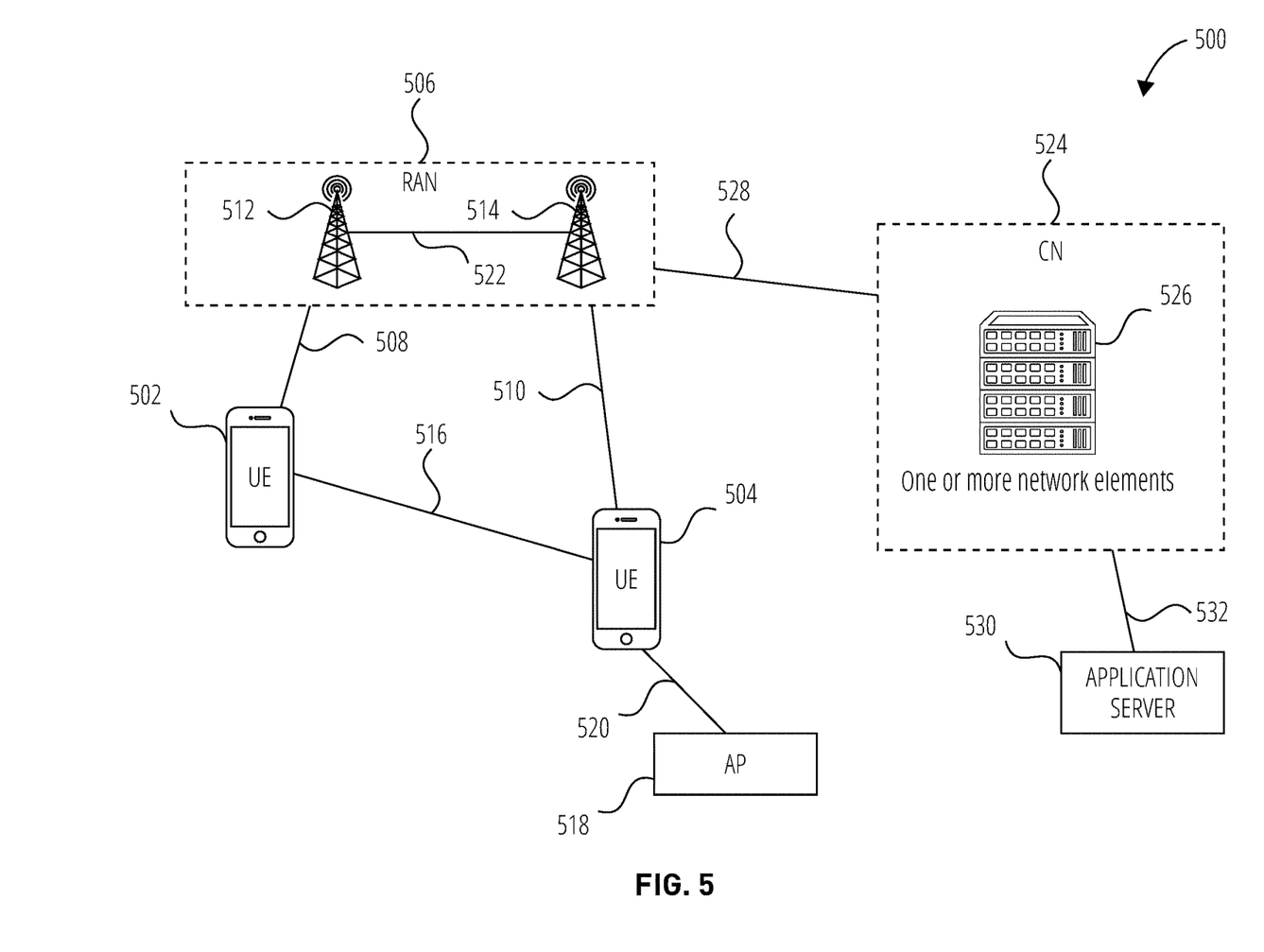
FIG. 5 illustrates an example architecture of a wireless communication system, according to embodiments disclosed herein.

FIG. 5 illustrates an example architecture of a wireless communication system 500, according to embodiments disclosed herein. The following description is provided for an example wireless communication system 500 that operates in conjunction with the LTE system standards and/or 5G or NR system standards as provided by 3GPP technical specifications.

As shown by FIG. 5, the wireless communication system 500 includes UE 502 and UE 504 (although any number of UEs may be used). In this example, the UE 502 and the UE 504 are illustrated as smartphones (e.g., handheld touchscreen mobile computing devices connectable to one or more cellular networks), but may also comprise any mobile or non-mobile computing device configured for wireless communication.

The UE 502 and UE 504 may be configured to communicatively couple with a RAN 506. In embodiments, the RAN 506 may be NG-RAN, E-UTRAN, etc. The UE 502 and UE 504 utilize connections (or channels) (shown as connection 508 and connection 510, respectively) with the RAN 506, each of which comprises a physical communications interface. The RAN 506 can include one or more base stations, such as base station 512 and base station 514, that enable the connection 508 and connection 510.

In this example, the connection 508 and connection 510 are air interfaces to enable such communicative coupling, and may be consistent with RAT(s) used by the RAN 506, such as, for example, an LTE and/or NR.

In some embodiments, the UE 502 and UE 504 may also directly exchange communication data via a sidelink interface 516. The UE 504 is shown to be configured to access an access point (shown as AP 518) via connection 520. By way of example, the connection 520 can comprise a local wireless connection, such as a connection consistent with any IEEE 802.11 protocol, wherein the AP 518 may comprise a Wi-Fi® router. In this example, the AP 518 may be connected to another network (for example, the Internet) without going through a CN 524.

In embodiments, the UE 502 and UE 504 can be configured to communicate using orthogonal frequency division multiplexing (OFDM) communication signals with each other or with the base station 512 and/or the base station 514 over a multicarrier communication channel in accordance with various communication techniques, such as, but not limited to, an orthogonal frequency division multiple access (OFDMA) communication technique (e.g., for downlink communications) or a single carrier frequency division multiple access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, all or parts of the base station 512 or base station 514 may be implemented as one or more software entities running on server computers as part of a virtual network. In addition, or in other embodiments, the base station 512 or base station 514 may be configured to communicate with one another via interface 522. In embodiments where the wireless communication system 500 is an LTE system (e.g., when the CN 524 is an EPC), the interface 522 may be an X2 interface. The X2 interface may be defined between two or more base stations (e.g., two or more eNBs and the like) that connect to an EPC, and/or between two eNBs connecting to the EPC. In embodiments where the wireless communication system 500 is an NR system (e.g., when CN 524 is a 5GC), the interface 522 may be an Xn interface. The Xn interface is defined between two or more base stations (e.g., two or more gNBs and the like) that connect to 5GC, between a base station 512 (e.g., a gNB) connecting to 5GC and an eNB, and/or between two eNBs connecting to 5GC (e.g., CN 524).

The RAN 506 is shown to be communicatively coupled to the CN 524. The CN 524 may comprise one or more network elements 526, which are configured to offer various data and telecommunications services to customers/subscribers (e.g., users of UE 502 and UE 504) who are connected to the CN 524 via the RAN 506. The components of the CN 524 may be implemented in one physical device or separate physical devices including components to read and execute instructions from a machine-readable or computer-readable medium (e.g., a non-transitory machine-readable storage medium).

In embodiments, the CN 524 may be an EPC, and the RAN 506 may be connected with the CN 524 via an S1 interface 528. In embodiments, the S1 interface 528 may be split into two parts, an S1 user plane (S1-U) interface, which carries traffic data between the base station 512 or base station 514 and a serving gateway (S-GW), and the S1-MME interface, which is a signaling interface between the base station 512 or base station 514 and mobility management entities (MMEs).

In embodiments, the CN 524 may be a 5GC, and the RAN 506 may be connected with the CN 524 via an NG interface 528. In embodiments, the NG interface 528 may be split into two parts, an NG user plane (NG-U) interface, which carries traffic data between the base station 512 or base station 514 and a user plane function (UPF), and the S1 control plane (NG-C) interface, which is a signaling interface between the base station 512 or base station 514 and access and mobility management functions (AMFs).

Generally, an application server 530 may be an element offering applications that use internet protocol (IP) bearer resources with the CN 524 (e.g., packet switched data services). The application server 530 can also be configured to support one or more communication services (e.g., VoIP sessions, group communication sessions, etc.) for the UE 502 and UE 504 via the CN 524. The application server 530 may communicate with the CN 524 through an IP communications interface 532.

Figure 6:
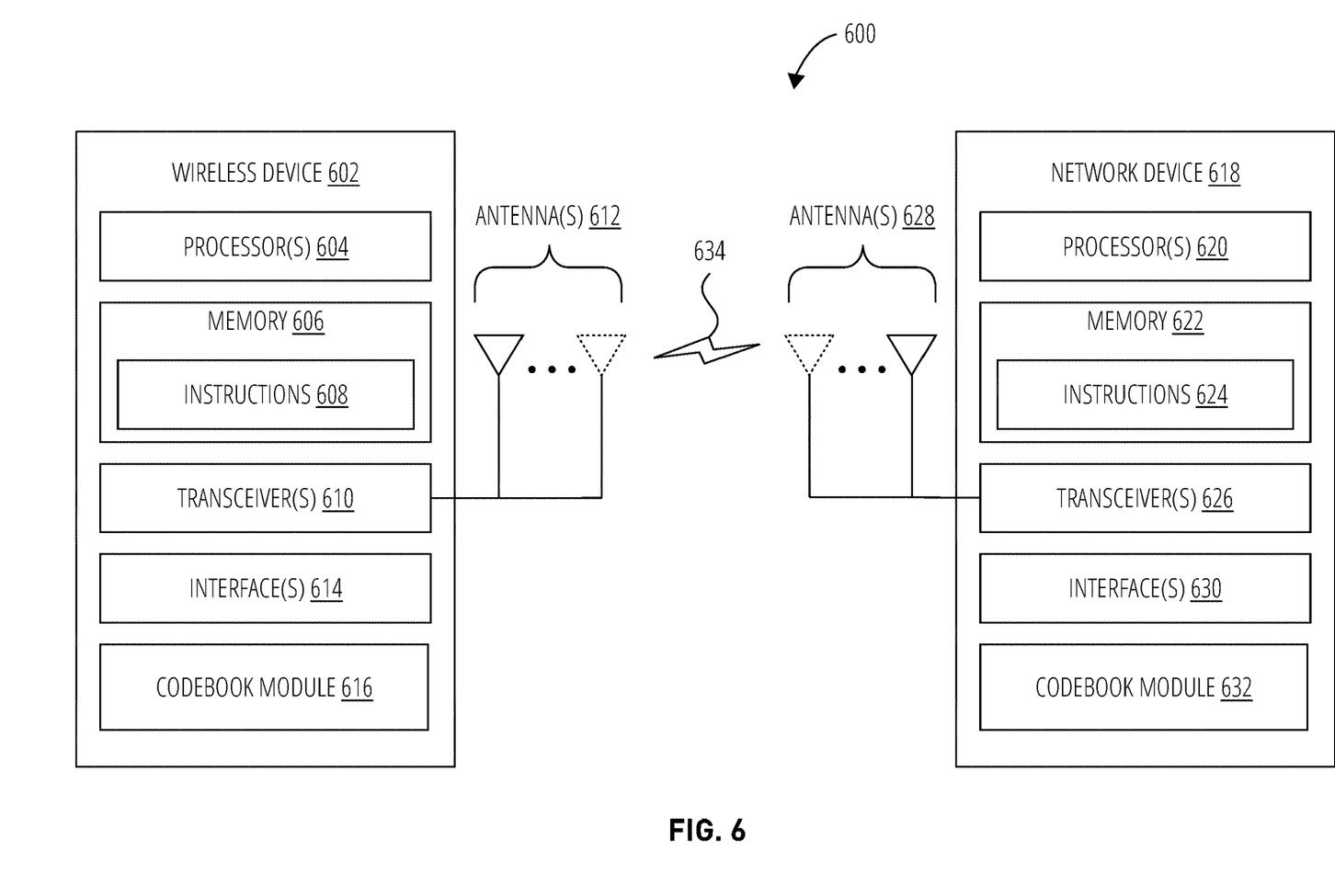
FIG. 6 illustrates a system for performing signaling between a wireless device and a network device, according to embodiments disclosed herein.

FIG. 6 illustrates a system 600 for performing signaling 634 between a wireless device 602 and a network device 618, according to embodiments disclosed herein. The system 600 may be a portion of a wireless communications system as herein described. The wireless device 602 may be, for example, a UE of a wireless communication system. The network device 618 may be, for example, a base station (e.g., an eNB or a gNB) or TRP of a wireless communication system.

The wireless device 602 may include one or more processor(s) 604. The processor(s) 604 may execute instructions such that various operations of the wireless device 602 are performed, as described herein. The processor(s) 604 may include one or more baseband processors implemented using, for example, a central processing unit (CPU), a digital signal processor (DSP), an application specific integrated circuit (ASIC), a controller, a field programmable gate array (FPGA) device, another hardware device, a firmware device, or any combination thereof configured to perform the operations described herein.

The wireless device 602 may include a memory 606. The memory 606 may be a non-transitory computer-readable storage medium that stores instructions 608 (which may include, for example, the instructions being executed by the processor(s) 604). The instructions 608 may also be referred to as program code or a computer program. The memory 606 may also store data used by, and results computed by, the processor(s) 604.

The wireless device 602 may include one or more transceiver(s) 610 that may include radio frequency (RF) transmitter and/or receiver circuitry that use the antenna(s) 612 of the wireless device 602 to facilitate signaling (e.g., the signaling 634) to and/or from the wireless device 602 with other devices (e.g., the network device 618) according to corresponding RATs.

The wireless device 602 may include one or more antenna(s) 612 (e.g., one, two, four, or more). For embodiments with multiple antenna(s) 612, the wireless device 602 may leverage the spatial diversity of such multiple antenna(s) 612 to send and/or receive multiple different data streams on the same time and frequency resources. This behavior may be referred to as, for example, multiple input multiple output (MIMO) behavior (referring to the multiple antennas used at each of a transmitting device and a receiving device that enable this aspect). MIMO transmissions by the wireless device 602 may be accomplished according to precoding (or digital beamforming) that is applied at the wireless device 602 that multiplexes the data streams across the antenna(s) 612 according to known or assumed channel characteristics such that each data stream is received with an appropriate signal strength relative to other streams and at a desired location in the spatial domain (e.g., the location of a receiver associated with that data stream). Certain embodiments may use single user MIMO (SU-MIMO) methods (where the data streams are all directed to a single receiver) and/or multi user MIMO (MU-MIMO) methods (where individual data streams may be directed to individual (different) receivers in different locations in the spatial domain).

In certain embodiments having multiple antennas, the wireless device 602 may implement analog beamforming techniques, whereby phases of the signals sent by the antenna(s) 612 are relatively adjusted such that the (joint) transmission of the antenna(s) 612 can be directed (this is sometimes referred to as beam steering).

The wireless device 602 may include one or more interface(s) 614. The interface(s) 614 may be used to provide input to or output from the wireless device 602. For example, a wireless device 602 that is a UE may include interface(s) 614 such as microphones, speakers, a touchscreen, buttons, and the like in order to allow for input and/or output to the UE by a user of the UE. Other interfaces of such a UE may be made up of transmitters, receivers, and other circuitry (e.g., other than the transceiver(s) 610/antenna(s) 612 already described) that allow for communication between the UE and other devices and may operate according to known protocols (e.g., Wi-Fi®, Bluetooth®, and the like).

The wireless device 602 may include a codebook module 616. The codebook module 616 may be implemented via hardware, software, or combinations thereof. For example, the codebook module 616 may be implemented as a processor, circuit, and/or instructions 608 stored in the memory 606 and executed by the processor(s) 604. In some examples, the codebook module 616 may be integrated within the processor(s) 604 and/or the transceiver(s) 610. For example, the codebook module 616 may be implemented by a combination of software components (e.g., executed by a DSP or a general processor) and hardware components (e.g., logic gates and circuitry) within the processor(s) 604 or the transceiver(s) 610.

The codebook module 616 may be used for various aspects of the present disclosure. For example, the codebook module 616 may be configured to perform the UE-based methods disclosed herein.

The network device 618 may include one or more processor(s) 620. The processor(s) 620 may execute instructions such that various operations of the network device 618 are performed, as described herein. The processor(s) 604 may include one or more baseband processors implemented using, for example, a CPU, a DSP, an ASIC, a controller, an FPGA device, another hardware device, a firmware device, or any combination thereof configured to perform the operations described herein.

The network device 618 may include a memory 622. The memory 622 may be a non-transitory computer-readable storage medium that stores instructions 624 (which may include, for example, the instructions being executed by the processor(s) 620). The instructions 624 may also be referred to as program code or a computer program. The memory 622 may also store data used by, and results computed by, the processor(s) 620.

The network device 618 may include one or more transceiver(s) 626 that may include RF transmitter and/or receiver circuitry that use the antenna(s) 628 of the network device 618 to facilitate signaling (e.g., the signaling 634) to and/or from the network device 618 with other devices (e.g., the wireless device 602) according to corresponding RATs.

The network device 618 may include one or more antenna(s) 628 (e.g., one, two, four, or more). In embodiments having multiple antenna(s) 628, the network device 618 may perform MIMO, digital beamforming, analog beamforming, beam steering, etc., as has been described.

The network device 618 may include one or more interface(s) 630. The interface(s) 630 may be used to provide input to or output from the network device 618. For example, a network device 618 that is a base station may include interface(s) 630 made up of transmitters, receivers, and other circuitry (e.g., other than the transceiver(s) 626/antenna(s) 628 already described) that enables the base station to communicate with other equipment in a core network, and/or that enables the base station to communicate with external networks, computers, databases, and the like for purposes of operations, administration, and maintenance of the base station or other equipment operably connected thereto.

The network device 618 may include a codebook module 632. The codebook module 632 may be implemented via hardware, software, or combinations thereof. For example, the codebook module 632 may be implemented as a processor, circuit, and/or instructions 624 stored in the memory 622 and executed by the processor(s) 620. In some examples, the codebook module 632 may be integrated within the processor(s) 620 and/or the transceiver(s) 626. For example, the codebook module 632 may be implemented by a combination of software components (e.g., executed by a DSP or a general processor) and hardware components (e.g., logic gates and circuitry) within the processor(s) 620 or the transceiver(s) 626.

The codebook module 632 may be used for various aspects of the present disclosure. For example, the codebook module 632 may be configured to perform the network-based methods disclosed herein.

Embodiments contemplated herein include an apparatus comprising means to perform one or more elements of the UE-based methods disclosed herein. This apparatus may be, for example, an apparatus of a UE (such as a wireless device 602 that is a UE, as described herein).

Embodiments contemplated herein include one or more non-transitory computer-readable media comprising instructions to cause an electronic device, upon execution of the instructions by one or more processors of the electronic device, to perform one or more elements of the UE-based methods disclosed herein. This non-transitory computer-readable media may be, for example, a memory of a UE (such as a memory 606 of a wireless device 602 that is a UE, as described herein).

Embodiments contemplated herein include an apparatus comprising logic, modules, or circuitry to perform one or more elements of the UE-based methods disclosed herein. This apparatus may be, for example, an apparatus of a UE (such as a wireless device 602 that is a UE, as described herein).

Embodiments contemplated herein include an apparatus comprising: one or more processors and one or more computer-readable media comprising instructions that, when executed by the one or more processors, cause the one or more processors to perform one or more elements of the UE-based methods disclosed herein. This apparatus may be, for example, an apparatus of a UE (such as a wireless device 602 that is a UE, as described herein).

Embodiments contemplated herein include a signal as described in or related to one or more elements of the UE-based methods disclosed herein.

Embodiments contemplated herein include a computer program or computer program product comprising instructions, wherein execution of the program by a processor is to cause the processor to carry out one or more elements of the UE-based methods disclosed herein. The processor may be a processor of a UE (such as a processor(s) 604 of a wireless device 602 that is a UE, as described herein). These instructions may be, for example, located in the processor and/or on a memory of the UE (such as a memory 606 of a wireless device 602 that is a UE, as described herein).

Embodiments contemplated herein include an apparatus comprising means to perform one or more elements of the network-based methods disclosed herein. This apparatus may be, for example, an apparatus of a base station (such as a network device 618 that is a base station, as described herein).

Embodiments contemplated herein include one or more non-transitory computer-readable media comprising instructions to cause an electronic device, upon execution of the instructions by one or more processors of the electronic device, to perform one or more elements of the network-based methods disclosed herein. This non-transitory computer-readable media may be, for example, a memory of a base station (such as a memory 622 of a network device 618 that is a base station, as described herein).

Embodiments contemplated herein include an apparatus comprising logic, modules, or circuitry to perform one or more elements of the network-based methods disclosed herein. This apparatus may be, for example, an apparatus of a base station (such as a network device 618 that is a base station, as described herein).

Embodiments contemplated herein include an apparatus comprising: one or more processors and one or more computer-readable media comprising instructions that, when executed by the one or more processors, cause the one or more processors to perform one or more elements of the network-based methods disclosed herein. This apparatus may be, for example, an apparatus of a base station (such as a network device 618 that is a base station, as described herein).

Embodiments contemplated herein include a signal as described in or related to one or more elements of the network-based methods disclosed herein.

Embodiments contemplated herein include a computer program or computer program product comprising instructions, wherein execution of the program by a processing element is to cause the processing element to carry out one or more elements of the network-based methods disclosed herein. The processor may be a processor of a base station (such as a processor(s) 620 of a network device 618 that is a base station, as described herein). These instructions may be, for example, located in the processor and/or on a memory of the base station (such as a memory 622 of a network device 618 that is a base station, as described herein).

For one or more embodiments, at least one of the components set forth in one or more of the preceding figures may be configured to perform one or more operations, techniques, processes, and/or methods as set forth herein. For example, a baseband processor as described herein in connection with one or more of the preceding figures may be configured to operate in accordance with one or more of the examples set forth herein. For another example, circuitry associated with a UE, base station, network element, etc. as described above in connection with one or more of the preceding figures may be configured to operate in accordance with one or more of the examples set forth herein.

Any of the above described embodiments may be combined with any other embodiment (or combination of embodiments), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method for a user equipment (UE), the method comprising:

receiving, at the UE, signals from a plurality of transmission and reception points (TRPs);

determining, at the UE, based on the signals, multiple TRP (multi-TRP) coherent joint transmission (CJT) channel state information (CSI) report information for a codebook $W_l$ given by $W_l^t = W_1^t \cdot W_2^t \cdot W_f^t$ for a spatial basis selection matrix $W_1^t$, a combination coefficient matrix $W_2^t$, and a frequency basis selection matrix $W_f^t$, wherein $t=1, 2, \ldots, T$ is a Type II codebook reported for a TRP t of the plurality of TRPs, T is a number of the plurality of TRPs, $l=0, 1, \ldots, RI-1$ is a layer index, and RI is a rank indicator, and wherein the spatial basis selection matrix $W_1^t$ is layer common, polarization common, and TRP independent; and reporting, from the UE to one or more of the plurality of TRPs, the multi-TRP CJT CSI report information to enable using the codebook $W_l$; and receiving, at the UE, from at least one of the one or more of the plurality of TRPs, a physical downlink shared channel (PDSCH) and its demodulation reference signal (DMRS) transmission, wherein the PDSCH and the DMRS are based on the codebook $W_l$.

2. The method of claim 1, wherein the codebook $W_l$ is given by:

$$W_l = \begin{pmatrix} c^1 \cdot W_1^1 \cdot W_2^1 \cdot W_f^1 \\ \ldots \\ c^T \cdot W_1^T \cdot W_2^T \cdot W_f^T \end{pmatrix}_l ;$$

wherein $c^t$ is a linear combination coefficient applied to each codebook for different TRPs of the plurality of TRPs.

3. The method of claim 2, wherein for a regular Type II codebook, the frequency basis selection matrix $W_f^t$ is independently reported for each layer.

4. The method of claim 2, wherein for a port selection Type II codebook the frequency basis selection matrix $W_f^t$ is layer common for each layer.

5. The method of claim 2, wherein the frequency basis selection matrix $W_f^t$ is polarization common for each layer per TRP of the plurality of TRPs.

6. The method of claim 2, wherein the frequency basis selection matrix $W_f^t$ is TRP independent for each TRP of the plurality of TRPs.

7. The method of claim 2, wherein the frequency basis selection matrix $W_f^t$ is TRP common for each TRP of the plurality of TRPs.

8. The method of claim 2, wherein the combination coefficient matrix $W_2^t$ is reported independently for each layer.

9. The method of claim 2, wherein the combination coefficient matrix $W_2^t$, for different polarizations, is polarization independent for each layer per TRP of the plurality of TRPs.

10. The method of claim 2, wherein the combination coefficient matrix $W_2^t$ is TRP independent for each TRP of the plurality of TRPs.

11. The method of claim 1, wherein the codebook $W_l$ is given by:

$$W_l = \begin{pmatrix} W_1^1 & 0 & 0 \\ 0 & \ddots & 0 \\ 0 & 0 & W_1^T \end{pmatrix}_l \cdot (W_2)_l \cdot (W_f)_l.$$

12. The method of claim 11, wherein for a regular Type II codebook, the frequency basis selection matrix $W_f^t$ is independently reported for each layer.

13. The method of claim 11, wherein for a port selection Type II codebook the frequency basis selection matrix $W_f^t$ is layer common for each layer.

14. The method of claim 11, wherein the frequency basis selection matrix $W_f^t$ is polarization common for each layer per TRP of the plurality of TRPs.

15. The method of claim 11, wherein the frequency basis selection matrix $W_f^t$ is TRP independent for each TRP of the plurality of TRPs.

16. The method of claim 11, wherein the frequency basis selection matrix $W_f^t$ is TRP common for each TRP of the plurality of TRPs.

17. The method of claim 11, wherein the combination coefficient matrix $W_2^t$ is layer independent for each layer.

18. The method of claim 11, wherein the combination coefficient matrix $W_2^t$ is polarization independent for each layer per TRP of the plurality of TRPs.

19. A method for a wireless network, the method comprising:
   determining that a user equipment (UE) is configured to receive signals from a plurality of transmission and reception points (TRPs);
   configuring the UE to generate multiple TRP (multi-TRP) coherent joint transmission (CJT) channel state information (CSI) report information for a codebook $W_l$, the codebook $W_l$ given by $W_l = W_1^t \cdot W_2^t \cdot W_f^t$ for a spatial basis selection matrix $W_1^t$, a combination coefficient matrix $W_2^t$, and a frequency basis selection matrix $W_f^t$, wherein t=1, 2, ..., T is a Type II codebook reported for a TRP t of the plurality of TRPs, T is a number of TRPs, l=0, 1, ..., RI–1 is a layer index, and RI is a rank indicator, and
   wherein the spatial basis selection matrix $W_1^t$ is layer common, polarization common, and TRP independent;
   receiving, from the UE, the multi-TRP CJT CSI report information;
   determining a precoding matrix using the codebook $W_l$ based on the multi-TRP CJT CSI report information; and
   sending, to the UE, from at least one or more of the plurality of TRPs, a physical downlink shared channel (PDSCH) and its demodulation reference signal (DMRS) transmission based on the precoding matrix.

20. The method of claim 19, wherein the method further comprises configuring, at the wireless network, a maximum number of non-zero coefficients (NZCs) that is reported across all layers.

* * * * *